United States Patent
Förster et al.

(10) Patent No.: US 9,873,414 B2
(45) Date of Patent: Jan. 23, 2018

(54) PARKING BRAKE SYSTEM FOR A VEHICLE

(71) Applicant: AUDI AG

(72) Inventors: Kilian Förster, Hainsberg (DE); Uwe Henrich, Eichstätt (DE); Timo Strutz, Wettstetten (DE); Christof Michenthaler, Gaimersheim (DE)

(73) Assignee: Audi AG, Ingolstadt (DE)

( * ) Notice: Subject to any disclaimer, the term of this patent is extended or adjusted under 35 U.S.C. 154(b) by 0 days.

(21) Appl. No.: 14/403,894

(22) PCT Filed: May 10, 2013

(86) PCT No.: PCT/EP2013/001396
§ 371 (c)(1),
(2) Date: Nov. 25, 2014

(87) PCT Pub. No.: WO2013/178323
PCT Pub. Date: Dec. 5, 2013

(65) Prior Publication Data
US 2015/0203082 A1 Jul. 23, 2015

(30) Foreign Application Priority Data
May 26, 2012 (DE) .................. 10 2012 010 562

(51) Int. Cl.
*B60T 7/12* (2006.01)
*B60T 8/17* (2006.01)
(Continued)

(52) U.S. Cl.
CPC ...... *B60T 8/17* (2013.01); *B60T 7/08* (2013.01); *B60T 7/122* (2013.01); *B60T 13/74* (2013.01)

(58) Field of Classification Search
None
See application file for complete search history.

(56) References Cited

U.S. PATENT DOCUMENTS 5,170,343 A * 12/1992 Matsuda ............ B60G 17/0185
700/79
6,322,161 B1 * 11/2001 Maslonka et al. ............. 303/89
(Continued)

FOREIGN PATENT DOCUMENTS

DE    197 51 431     7/1999
DE    100 25 731    12/2000
(Continued)

OTHER PUBLICATIONS

International Search Report issued by the European Patent Office in International Application PCT/EP2013/001396.

*Primary Examiner* — Thomas G Black
*Assistant Examiner* — Demetra Smith-Stewart
(74) *Attorney, Agent, or Firm* — Henry M. Feiereisen LLC

(57) ABSTRACT

A parking brake system for a vehicle, in particular for a motor vehicle, includes two control units, by means of which two actuators, which are designed to actuate respective wheel brakes, can be controlled. The control units are connected to a power source via separate lines, wherein exclusively one of the control units is connected to an operating device which is designed to transmit signals to the control unit for actuation of the wheel brakes. The control unit is designed to control at least one of the actuators, dependent on the signals for actuation of the wheel brakes.

6 Claims, 2 Drawing Sheets

(51) Int. Cl.
 *B60T 7/08* (2006.01)
 *B60T 13/74* (2006.01)

(56) References Cited

U.S. PATENT DOCUMENTS

| | | | | |
|---|---|---|---|---|
| 6,447,074 | B2* | 9/2002 | Engelhard | B60T 7/107 |
| | | | | 303/3 |
| 6,607,251 | B2* | 8/2003 | Baumgartner | B60T 7/042 |
| | | | | 303/122.05 |
| 8,738,234 | B2* | 5/2014 | Irie et al. | 701/48 |
| 8,752,908 | B2* | 6/2014 | Heise | 303/20 |
| 9,428,159 | B2* | 8/2016 | Heise | B60T 7/042 |
| 2001/0035679 | A1* | 11/2001 | Riddiford | B60T 7/042 |
| | | | | 303/155 |
| 2002/0050739 | A1* | 5/2002 | Koepff | B60T 8/326 |
| | | | | 303/122.09 |
| 2003/0006726 | A1* | 1/2003 | Weiberle | B60T 13/662 |
| | | | | 318/370 |
| 2006/0232124 | A1* | 10/2006 | Friederich | B60T 7/12 |
| | | | | 303/3 |
| 2006/0279136 | A1* | 12/2006 | Haeussler | B60T 13/746 |
| | | | | 303/20 |
| 2008/0105502 | A1* | 5/2008 | Koth | B60T 13/74 |
| | | | | 188/72.6 |
| 2008/0185235 | A1* | 8/2008 | Suzuki | 188/1.11 E |
| 2008/0296106 | A1* | 12/2008 | Nilsson | B60T 8/321 |
| | | | | 188/156 |
| 2009/0195058 | A1* | 8/2009 | Jackson | B60T 7/122 |
| | | | | 303/20 |
| 2009/0200124 | A1* | 8/2009 | Heise | B60T 7/042 |
| | | | | 188/162 |
| 2009/0326767 | A1* | 12/2009 | Kamada | B60T 1/005 |
| | | | | 701/48 |
| 2010/0121547 | A1* | 5/2010 | Demmer | B60R 25/08 |
| | | | | 701/70 |
| 2010/0198473 | A1* | 8/2010 | Strengert | B60T 17/221 |
| | | | | 701/70 |
| 2010/0204894 | A1* | 8/2010 | Strengert | B60T 17/221 |
| | | | | 701/70 |
| 2010/0314934 | A1* | 12/2010 | Leiter | 303/20 |
| 2011/0017554 | A1* | 1/2011 | Baehrle-Miller | B60T 7/12 |
| | | | | 188/72.1 |
| 2011/0202246 | A1* | 8/2011 | Lindsay | B60T 1/005 |
| | | | | 701/70 |
| 2012/0065816 | A1* | 3/2012 | Cahill | B60T 8/00 |
| | | | | 701/3 |
| 2012/0090928 | A1* | 4/2012 | Roll | B60T 7/042 |
| | | | | 188/106 R |
| 2012/0130615 | A1* | 5/2012 | Geyer | B60T 8/267 |
| | | | | 701/70 |
| 2013/0175125 | A1 | 7/2013 | Förster | |

FOREIGN PATENT DOCUMENTS

| | | |
|---|---|---|
| DE | 10 2007 037 685 | 2/2009 |
| DE | 10 2010 002 020 | 8/2011 |
| DE | 10 2011 084 534 | 10/2012 |
| WO | WO 2009/074252 | 6/2009 |

\* cited by examiner

PARKING BRAKE SYSTEM FOR A VEHICLE

CROSS-REFERENCES TO RELATED APPLICATIONS

This application is the U.S. National Stage of International Application No. PCT/EP2013/001396, filed May 10, 2013, which designated the U.S. and has been published as International Publication No. WO 2013/178323 and which claims the priority of German Patent Application, Ser. No. 10 2012 010 562.2, filed May 26, 2012, pursuant to 35 U.S.C. 119(a)-(d).

BACKGROUND OF THE INVENTION

The invention relates to a parking brake system for a vehicle, in particular for a motor vehicle.

Such a parking brake system for a motor vehicle is known from DE 197 51 431 A1. The parking brake system includes two control units configured to control actuators associated with the respectively control units, wherein the actuators are in turn configured to actuate respective wheel brakes of the parking brake system. In addition, the control units can be optionally connected via separate lines to a first or a second power source.

DE 10 2007 037 685 A1 shows a parking brake system for a motor vehicle with a central control unit configured to control two actuators for actuating respective wheel brakes of the parking brake system.

SUMMARY OF THE INVENTION

It is the object of the present invention to provide a fail-safe parking brake system, which can reliably secure a vehicle against rolling away and which can also released.

An inventive parking brake system for a vehicle, in particular for a motor vehicle, includes two control units configured to control two actuators, wherein the actuators are adapted to actuate respective wheel brakes, wherein the control units are connected to a power source via separate lines, wherein the parking brake system of the invention is characterized in that only one of the control units is connected to an operating device which is adapted to transmit to this control unit signals for actuating the wheel brakes, which is adapted to control at least one of the actuators in response to the signals for actuating the wheel brakes. While the subject matter of DE 197 51 431 A1 discloses to connect the two control units of the parking brake system with a single operating device, according to the invention only one of the control units is connected with the operating device. By avoiding the redundant connection of the control unit with the operating device, a simpler and more cost-effective structure of the parking brake system is attained, while the vehicle can still be reliably secured against rolling away and also released.

According to an advantageous embodiment of the invention, one of the control units is connected to another power source. This ensures that even when one power source fails, with which both control units are connected, the operation of at least one of the control units can be ensured, so that the parking brake system can reliably prevent a vehicle from rolling away and can be released again. The redundant power supply of the parking brake system obviated the need for parking locks usually installed in vehicles with automatic transmissions, thereby reducing the overall cost in the design of the entire vehicle.

According to another advantageous embodiment of the invention, the control units are connected with one another via a data communications interface, wherein the control units are configured to communicate with one another via the data communication interface. The data communication interface may be, for example, a CAN bus, a FlexRay, an SPI-bus system, an I²C-bus system and the like. The received signals can then be transmitted from one control unit to the other control unit for actuating the wheel brakes, enabling a coordinated actuation of the actuators in a simple manner.

According to another advantageous embodiment of the invention, the control units may each be configured to control both actuators. Even when one of the control units fails, the operation of the parking brake system is thus guaranteed by the redundant design.

According to another advantageous embodiment of the invention, the control units may be configured to control the actuators automatically in response to at least one signal characteristic of a movement of the vehicle. For example, the control units may be configured to process signals from the speed and/or acceleration sensors, and to automatically control the actuators based on these signals. On the one hand, the automatic controllability of the control units may be used to assist a driver of the vehicle with operating the vehicle depending on driving conditions, for example similar to a Hill Start Assist and the like. On the other hand, it can be ensured that, when the transmission of signals to one of the control units for actuation of the wheel brakes fails, the parking brake system still secures the vehicle against rolling away even in such a situation.

According to another advantageous embodiment of the invention, the control unit that is not connected to the operating device may be operated in an automatic mode, if the control unit connected to the operating device and/or the operating device malfunctions. In this way, a vehicle can be secured against rolling away and released in the event that the signal transmission from the operating device to the associated control unit is malfunctioning.

According to another advantageous embodiment of the invention, at least one of the control units may be arranged in a controller of the vehicle which is configured to control at least one element different from the actuators of the vehicle. For example, the controller may be an ESP controller, a transmission controller and the like, in which at least one of the control units is integrated. Components already provided in such a controller, such as processors and the like, and/or existing software can then also be at least partially used by the control unit, so that the parking brake system can be produced more cost-effectively. Furthermore, installation space can be saved, so that the parking brake system can be designed to be more compact.

According to another advantageous embodiment of the invention, at least one of the control units may be arranged in a separate controller of the vehicle. In this way, the two controllers can be spatially separated, thereby improving, for example, shielding of the at least unit one control unit arranged in the separate controller and thus also the overall reliability.

Lastly, according to an alternative advantageous embodiment of the invention, the control units may be arranged in two different controllers of the vehicle, with each of them being configured to control at least one element different from the actuators of the vehicle. Thus, both control units can use components already provided in the controllers, such as processors and the like, so that the parking brake system can be manufactured in a more cost-effective and space-saving manner. Alternatively, the control units may be arranged in a common housing, wherein the control units may, however, be separated from each other inside the common housing and arranged, for example, in separate chambers and the like. This ensures that both control units are not damaged and/or fail simultaneously, for example when water enters into the common housing, due to the separate enclosure of the control units.

Additional advantages, features and details of the invention will become apparent from the following description of a preferred embodiment and the drawings. The features and combinations of features mentioned above in the written description and the features and feature combinations mentioned below in the description of the drawings and/or shown separately in the figures can not only be used in the respective indicated combinations, but also in other combinations or severally, without going beyond the scope of the invention.

DETAILED DESCRIPTION OF PREFERRED EMBODIMENTS

Figure 1:
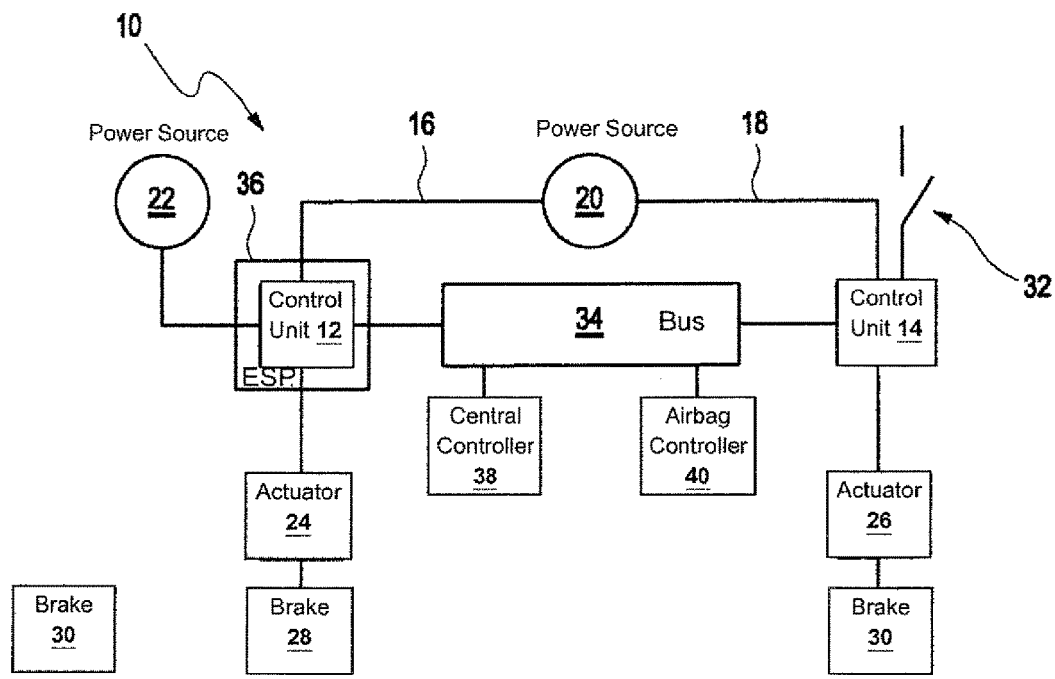
FIG. 1 a schematic diagram of a parking brake system for a motor vehicle, including two control units configured to control two actuators which are configured to actuate respective wheel brakes, wherein one of the two control units is integrated in an ESP controller of the motor vehicle and the other control unit is connected to an operating device.

Identical or functionally similar elements are labeled in the figures with identical reference numerals.

A parking brake system 10 for an unillustrated motor vehicle is shown in FIG. 1 in a schematic view. The parking brake system 10 includes a first control unit 12 and a second control unit 14, which are connected via separate lines 16, 18 to a power source 20. The power source 20 may, for example, be a battery of the unillustrated motor vehicle which supplies electrical energy to the control units 12, 14. The control unit 12 is also connected to another power source 22 which ensures a redundant supply of power to the parking brake system 10. For example, the other power source 22 may be a second battery of the motor vehicle. Alternatively, the power source 22 may also be formed, for example, as a capacitor and the like, and configured to supply redundant power to the control unit 12. In addition, contrary to the depicted diagram, not the control unit 12, but rather the control unit 14 may be connected to the other power source 22. Furthermore, the control units 12, 14 may each be connected to a separate unillustrated power source. For example, in a hybrid vehicle, the control unit 12 may be powered from a traction battery of a hybrid vehicle, whereas the other control unit 14 may be powered from an additional battery of the hybrid vehicle, or vice versa.

The two control units 12, 14 are each connected to the actuators 24, 26, which are in turn connected to their associated wheel brakes 28, 30. The control units 12, 14 are configured to control the actuators 24, 26 so as to engage or release the wheel brakes 28, 30. The wheel brakes 28, 30 are engaged or released, for example, in response to a command from a vehicle user by operating an operating device 32, which in the present example is connected to the control unit 14. The operating device 32 is configured to transmit to the control unit 14 signals for actuating the wheel brakes 28, 30, wherein the control unit 14 is in turn configured to control at least one of the actuators 24, 26 in response to the signals for actuating the wheel brakes 28, 30. In the simplest case, the operating device 32 may be an electrical button or switch, wherein the operating device 32 may be formed as a knob, a slider and the like.

The control units 12, 14 are connected with one another via a data communication interface configured as a bus 34, allowing them to exchange signals with one another or to communicate with one another. In the present example, the control unit 12 is integrated in an ESP controller 36, which is also connected to the bus 34. The control unit 12 can then use elements provided in the ESP controller 36, which are not shown here in detail, such as processors and the like, thus obviating the need for providing these elements separately for the control unit 12. The control unit 14 is integrated in a separate unillustrated controller, which is provided exclusively for performing functions of the parking brake system 10. In the event that the bus system 34 fails, the control unit 12 is configured to automatically actuate the actuator 24 and thus the wheel brake 28. The control unit 12 is configured to control the actuator 24 in response to at least one signal characteristic of a movement of the vehicle.

In the illustrated embodiment, the bus 34 is connected to a central controller 38 and an airbag controller 40. Instead of the airbag controller 40, another controller may be used. The central controller 38 includes a plurality of unillustrated sensors integrated in the central controller 38. These may be, for example, rotation speed and/or acceleration sensors, which can detect corresponding movements of the vehicle and its wheels. The airbag controller 40 may also provide a (not further described) longitudinal acceleration signal of the motor vehicle. These signals characteristic of the movement of the vehicle are provided to the control units 12, 14 by the central controller 38 and/or by the airbag controller 40 via the bus 34.

When the communication between the control units 12, 14 malfunctions, the control units 12, 14 may in the illustrated example still be able to control at least the respective associated actuator 24 or 26 in order to prevent the motor vehicle from rolling away at least by actuating one of the wheel brakes 28, 30. In addition, a warning message, for example in the form of an illuminated lamp and the like, may be outputted in an unillustrated cockpit of the motor vehicle, so as to immediately inform a user of the motor vehicle of a malfunction of the parking brake system 10.

Moreover, signals and information relating to one or more wheel rotation speeds of the motor vehicle, which are detected by or at least provided within the ESP controller 36, may be supplied to the control unit 12 integrated in the ESP controller 36.

Figure 2:
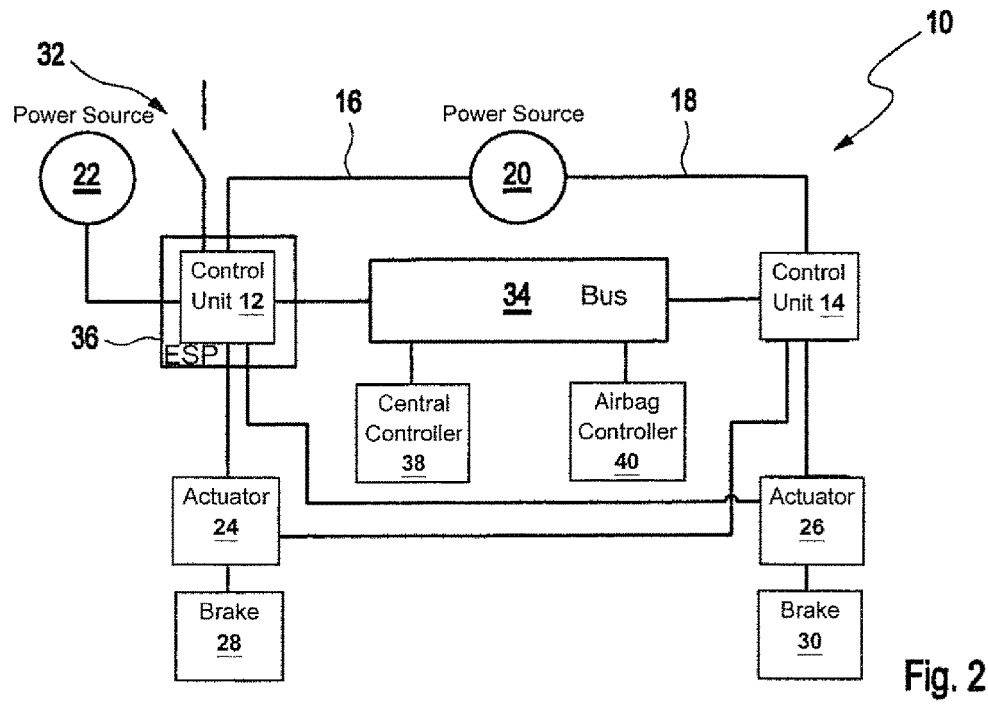
FIG. 2 another embodiment of the parking brake system shown in FIG. 1, which is distinguished in that both control units are each connected to both actuators and that the control unit integrated in the ESP controller is connected to the operating device.

In FIG. 2 shows in a schematic diagram another embodiment of the parking brake system 10 which differs from the parking brake system 10 shown in FIG. 1 in that the control unit 12 is connected to the operating device 32 and the control units 12, 14 are connected with both actuators 24, 26 so that each of the control units 12, 14 is able to control each of the actuators 24, 26. To enable a controlled activation of the actuators 24, 26, the control units 12, 14 communicate with one another via the bus 34, thereby controlling the actuators 24, 26 by way of the control units 12, 14. For example, the control unit 12 may output to the control unit 14 via the bus 34 the command to actuate or release the actuator 26 at a given time, at which the control unit 12 itself actuates the actuator 24 to engage or release the wheel brake 28. When one of the two control units 12, 14 fails, the illustrated redundant connection of the control units 12, 14 with each of the two actuators 24, 26 at least ensures that the still functioning control unit 12 or 14 is able to actuate both wheel brakes 28, 30.

Figure 3:
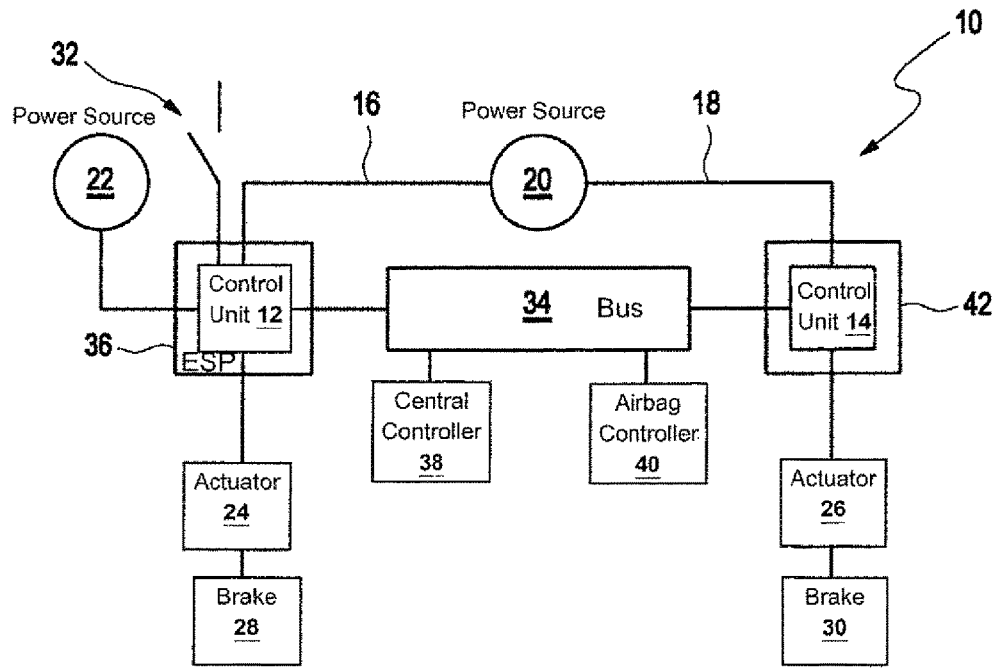
FIG. 3 another embodiment of the parking brake system, wherein one of the control units is still integrated in the ESP controller, whereas the other control unit is integrated into a transmission controller, and the two control units are each connected to a respective one of the actuators.

FIG. 3 shows another embodiment of the parking brake system 10. The control unit 14 is integrated in a transmission controller 42, wherein the control unit 14 is able to access or use elements (not specified here in detail) of the transmission controller 42, such as processors and the like, so that these elements and units need not be provided separately for the control unit 14. Except for the difference, that the control unit 14 is integrated in the transmission controller 42 and is not, as in the embodiment of FIG. 1, formed in a separate controller and the control unit 12 is connected to the operating device 32, FIGS. 1 and 3 represent essentially identical embodiments of the parking brake system 10.

Figure 4:
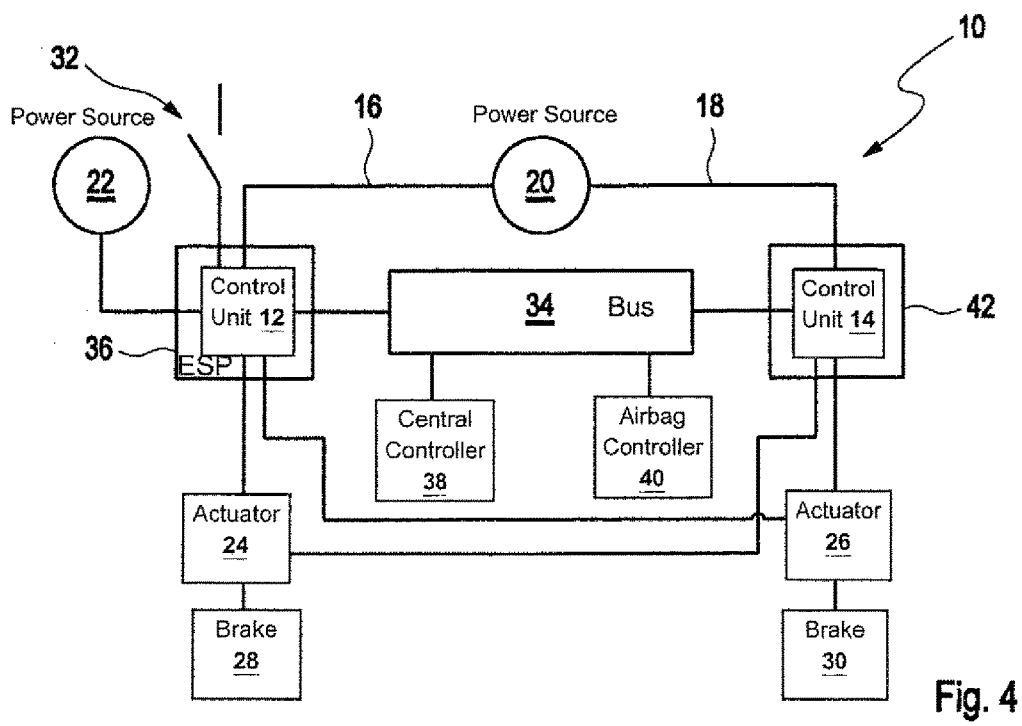
FIG. 4 another embodiment of the parking brake system, wherein this embodiment differs from the embodiment shown in FIG. 3 in that both control units are each connected to both actuators.

Lastly, FIG. 4 shows another embodiment of the parking brake system 10. This embodiment differs from the embodiment shown in FIG. 3 in that the control units 12, 14 are each connected to and able to control both actuators 24, 26.

What is claimed is:

1. A parking brake system for a vehicle, comprising:
   two actuators designed to each operate a separate wheel brake associated with a respective one of the two actuators,
   a controller including a processor,
   two control units directly controlling the two actuators via two direct lines, wherein the two control units and the two actuators are connected to a single power source via separate lines, with one of the two control units being connected to an additional power source, at least one of the two control units being arranged in the controller and operably connected to the processor, and
   an operating device connected to only one of the control units; wherein the operating device is configured to transmit signals for actuating the wheel brakes to the one control unit; with the one control unit controlling at least one of the actuators in response to the transmitted signals for actuating the wheel brakes.

2. The parking brake system of claim 1, wherein the vehicle is a motor vehicle, said controller being a component of the motor vehicle.

3. The parking brake system of claim 1, wherein the two control units are connected to one another via a data communication interface and configured to communicate with one another via the data communication interface.

4. The parking brake system of claim 1, wherein the two control units are configured to automatically control the actuators in response to at least one signal characteristic of a movement of the vehicle.

5. The parking brake system of claim 1, wherein the control unit that is not connected to the operating device is operated in an automatic mode when the one control unit connected to the operating device or the operating device is malfunctioning.

6. The parking brake system of claim 1, further comprising a further controller, said other one of the two control units being arranged in the further controller and operably connected to a processor of the further controller.

\* \* \* \* \*